United States Patent
Long et al.

(10) Patent No.: US 11,625,433 B2
(45) Date of Patent: Apr. 11, 2023

(54) METHOD AND APPARATUS FOR SEARCHING VIDEO SEGMENT, DEVICE, AND MEDIUM

(71) Applicant: Beijing Baidu Netcom Science and Technology Co., Ltd., Beijing (CN)

(72) Inventors: Xiang Long, Beijing (CN); Ping Wang, Beijing (CN); Fu Li, Beijing (CN); Dongliang He, Beijing (CN); Hao Sun, Beijing (CN); Shilei Wen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/182,960

(22) Filed: Feb. 23, 2021

(65) Prior Publication Data

US 2021/0319062 A1 Oct. 14, 2021

(30) Foreign Application Priority Data

Apr. 9, 2020 (CN) .......................... 202010274782.3

(51) Int. Cl.
*G06F 16/30* (2019.01)
*G06F 16/783* (2019.01)
(Continued)

(52) U.S. Cl.
CPC .......... *G06F 16/7847* (2019.01); *G06F 18/22* (2023.01); *G06V 20/46* (2022.01); *G06V 20/48* (2022.01)

(58) Field of Classification Search
CPC .. G06F 16/7847; G06K 9/6215; G06V 20/46; G06V 20/48
See application file for complete search history.

(56) References Cited

U.S. PATENT DOCUMENTS 7,184,100 B1 * 2/2007 Wilf ....................... G11B 27/28
348/700
8,953,836 B1 * 2/2015 Postelnicu ............. G06V 20/48
382/100

(Continued)

FOREIGN PATENT DOCUMENTS

CN 102737135 A 10/2012
CN 102890700 A 1/2013

(Continued)

OTHER PUBLICATIONS

Article entitled "Visual Analysis of Child-Adult Interactive Behaviors in Video Sequences", by Liu et al., dated 2010 (Year: 2010).*

(Continued)

*Primary Examiner* — Mahesh H Dwivedi
(74) *Attorney, Agent, or Firm* — Kilpatrick Townsend & Stockton LLP

(57) ABSTRACT

Embodiments of the present disclosure disclose a method and apparatus for searching a video segment, a device and a medium, and relate to the field of video data search. The method includes: sampling video frames from a target video and videos to be searched in a video library, and extracting features from the sampled frames; matching the target video and the videos to be searched according to the extracted features to determine a candidate video to be searched that matches the target video; determining at least one candidate video segment from the determined candidate video, and calculating a degree of matching between the target video and each candidate video segment based on the extracted features of each sampled frame; and determining a video segment matching the target video in the videos to be searched according to the calculated degree of matching between the target video and each candidate video segment.

17 Claims, 4 Drawing Sheets

(51) Int. Cl.
*G06V 20/40* (2022.01)
*G06F 18/22* (2023.01)

(56) References Cited

U.S. PATENT DOCUMENTS

| | | | |
|---|---|---|---|
| 10,152,479 B1* | 12/2018 | Granström | G06F 16/483 |
| 2008/0288509 A1* | 11/2008 | Mysen | G06F 16/24 |
| 2010/0085481 A1* | 4/2010 | Winter | G06V 20/40 |
| | | | 348/E5.009 |
| 2011/0274360 A1 | 11/2011 | Watanabe et al. | |
| 2015/0339380 A1 | 11/2015 | Zhang et al. | |
| 2017/0293803 A1* | 10/2017 | Smetanin | H04N 21/23113 |

FOREIGN PATENT DOCUMENTS

| | | |
|---|---|---|
| CN | 104239566 A | 12/2014 |
| CN | 107943849 A | 4/2018 |
| CN | 108427925 A | 8/2018 |
| CN | 108763295 A | 11/2018 |
| CN | 109977262 A | 7/2019 |
| JP | 2011-237879 A | 11/2011 |

OTHER PUBLICATIONS

Article entitled "VCDB: A Large-Scale Database for Partial Copy Detection in Videos", by Jiang et al., dated 2014 (Year: 2014).*

Wang, Ling et al., "Compact CNN Based Video Representation for Efficient Video Copy Detection," ICIAP: International Conference on Image Analysis and Processing, 17th International Conference, Naples, Italy, Sep. 9-13, Springer International Publishing, pp. 576-587, (Dec. 31, 2016).

Balestriero Randall, et al. "Deep Neural Networks," ARXIV.org, Cornell University Library, 201 Olin Library Cornell University Ithaca, NY, 14853, pp. 1-80, (Oct. 25, 2017).

European Search Report dated Jul. 15, 2021 of corresponding European Paient Application No. 21159246.4 (Six pages).

Jiang, Yu-Gang et al., "VCDB: A Large-Scale Database for Partial Copy Detection in Videos," School of Computer Science, Shanghai Key Laboratory of Intelligent Information Processing, Fudan University, Shanghai, China, ECCV 2014, Part IV, LNCS 8692, pp. 357-371, Springer International Publishing Switzerland (2014).

Korean Office Action dated Jul. 15, 2022 in related Korean Application No. 10-2021-0029978 (nine pages).

Written Opinion dated Sep. 14, 2022 in related Korean Application No. 10-2021-0029978 (sixteen pages).

Notice of Reasons First Refusal dated Jul. 20, 2022 in related Japan Application No. 2021-037355 (six pages).

Written Opinion dated Oct. 25, 2022 in related Japan Application No. 2021-037355 (eleven pages).

Decision to Grant Patent dated Jan. 10, 2023 in related Japan Application No. 2021-037355 (five pages).

"Content-Based Video Copy Detection" Dalian University of Technology, pp. 1-60, (Mar. 25, 2017).

* cited by examiner

METHOD AND APPARATUS FOR SEARCHING VIDEO SEGMENT, DEVICE, AND MEDIUM

CROSS-REFERENCE TO RELATED APPLICATIONS

This application claims priority to Chinese Patent Application No. 202010274782.3, filed with the China National Intellectual Property Administration (CNIPA) on Apr. 9, 2020, the contents of which are incorporated herein by reference in their entirety.

TECHNICAL FIELD

Embodiments of the present disclosure relate to the field of computer technology, specifically to the field of video search technology, and particularly to a method and apparatus for searching a video segment, a device and a computer-readable medium.

BACKGROUND

Videos may provide richer dynamic contents than images. With diversified developments of video applications, the video search technology has become increasingly important. There are diverse videos in the network. The traditional video search method is to uniformly extract frames from a to-be-matched video, calculate matching degrees between the extracted image frames of the video and the image frames of a video in a library, and count the matching degrees of all the extracted image frames to obtain matching results of the video.

With a low limitation for editing videos, the ways of generating videos have gradually diversified. A large number of videos are edited and synthesized from a plurality of other video segments. For this type of video, it is difficult to obtain accurate results by searching the entire video.

SUMMARY

Embodiments of the present disclosure provide a method and apparatus for searching a video segment, a device and a computer-readable medium.

In a first aspect, embodiments of the present disclosure provide a method for searching a video segment, comprising: sampling video frames from a target video and videos to be searched in a video library, and extracting features from the sampled frames; matching the target video and the videos to be searched according to the features of the sampled frames to determine a candidate video to be searched that matches the target video; determining at least one candidate video segment from the candidate video to be searched, and calculating the degree of matching between the target video and each candidate video segment based on the feature of each sampled frame; and determining a video segment matching the target video in the videos to be searched according to the degree of matching between the target video and each candidate video segment.

In some embodiments, the matching comprises: determining, according to the features of the sampled frames, matching results between the sampled frames in the target video and the sampled frames in the videos to be searched; and counting the matching results, and determining, according to the counted matching results, the candidate video to be searched that matches the target video.

In some embodiments, the determining at least one candidate video segment from the candidate video to be searched comprises: combining every two sampled frames of the candidate video to be searched to obtain at least one sampled frame pair, and using the two sampled frames in the sampled frame pair as a start frame and an end frame of a candidate video segment to obtain the at least one candidate video segment.

In some embodiments, the calculating comprises: calculating a similarity between each sampled frame in the target video and each sampled frame in the candidate video segment based on the feature of each sampled frame; and determining the degree of matching between the target video and the candidate video segment based on the similarity between each sampled frame in the target video and each sampled frame in the candidate video segments.

In some embodiments, the determining the degree of matching between the target video and the candidate video segment comprises: determining a similarity between the target video and the candidate video segment based on the similarity between each sampled frame in the target video and each sampled frame in the candidate video segment; and superimposing the similarity between the target video and the candidate video segment with a preset value of a reward function to obtain the degree of matching between the target video and the candidate video segment; wherein the preset value of the reward function is positively correlated with the length of the candidate video segment.

In some embodiments, the determining at least one candidate video segment from the candidate video to be searched comprises: determining the at least one candidate video segment, a ratio of whose length to a length of the target video is within a preset interval, from the candidate video to be searched.

In some embodiments, the determining a video segment matching the target video in the videos to be searched comprises: determining, from the candidate video segments, a target candidate video segment whose degree of matching with the target video satisfies a preset condition; and searching previous frames based on the position of the sampled frame serving as a start frame of the target candidate video segment in the corresponding video to be searched, searching subsequent frames based on the position of the sampled frame serving as an end frame of the target candidate video segment in the corresponding video to be searched, and determining a start frame and an end frame of the video segment matching the target video in the corresponding video to be searched.

In a second aspect, embodiments of the present disclosure provide an apparatus for searching a video segment, comprising: an extraction unit, configured to sample video frames from a target video and videos to be searched in a video library, and extract features from the sampled frames; a first determination unit, configured to match the target video and the videos to be searched according to the features of the sampled frames to determine a candidate video to be searched that matches the target video; a calculation unit, configured to determine at least one candidate video segment from the candidate video to be searched, and calculate the degree of matching between the target video and each candidate video segment based on the feature of each sampled frame; and a second determination unit, configured to determine a video segment matching the target video in the videos to be searched according to the degree of matching between the target video and each candidate video segment.

In some embodiments, the first determination unit comprises: a matching unit, configured to determine, according to the features of the sampled frames, matching results between the sampled frames in the target video and the sampled frames in the videos to be searched; and a counting unit, configured to count the matching results, and determine, according to the counted matching results, the candidate video to be searched that matches the target video.

In some embodiments, the calculation unit is configured to determine the at least one candidate video segment from the candidate video to be searched as follows: combining every two sampled frames of the candidate video to be searched to obtain at least one sampled frame pair, and using the two sampled frames in the sampled frame pair as a start frame and an end frame of a candidate video segment to obtain the at least one candidate video segment.

In some embodiments, the calculation unit is configured to calculate as follows: calculating a similarity between each sampled frame in the target video and each sampled frame in the candidate video segment based on the feature of each sampled frame; and determining the degree of matching between the target video and the candidate video segment based on the similarity between each sampled frame in the target video and each sampled frame in the candidate video segment.

In some embodiments, the second determination unit comprises: a video-level similarity calculation unit, configured to determine a similarity between the target video and the candidate video segment based on the similarity between each sampled frame in the target video and each sampled frame in the candidate video segment; and a reward function superimposition unit, configured to superimpose the similarity between the target video and the candidate video segment with a preset value of a reward function to obtain the degree of matching between the target video and the candidate video segment; wherein the preset value of the reward function is positively correlated with the length of the candidate video segment.

In some embodiments, the calculation unit is configured to determine the at least one candidate video segment from the candidate video to be searched as follows: determining the at least one candidate video segment, a ratio of whose length to a length of the target video is within a preset interval, from the candidate video to be searched.

In some embodiments, the second determination unit comprises: a screening unit, configured to determine, from the candidate video segments, a target candidate video segment whose degree of matching with the target video satisfies a preset condition; and a search unit, configured to search previous frames based on the position of the sampled frame serving as a start frame of the target candidate video segment in the corresponding video to be searched, search subsequent frames based on the position of the sampled frame serving as an end frame of the target candidate video segment in the corresponding video to be searched, and determine a start frame and an end frame of the video segment matching the target video in the corresponding video to be searched.

In a third aspect, embodiments of the present disclosure provide an electronic device, comprising: one or more processors; and a storage apparatus, storing one or more programs, wherein the one or more programs, when executed by the one or more processors, cause the one or more processors to implement the method for searching a video segment provided by the first aspect.

In a forth aspect, embodiments of the present disclosure provide a computer-readable medium, storing a computer program thereon, wherein the program, when executed by a processor, causes the processor to implement the method for searching a video segment provided by the first aspect.

In the method and apparatus for searching a video segment according to the above embodiments of the present disclosure, video frames are sampled from a target video and videos to be searched in a video library, features are extracted from the sampled frames, then the target video and the videos to be searched are matched according to the features of the sampled frames to determine a candidate video to be searched that matches the target video, at least one candidate video segment is determined from the candidate video to be searched, the degree of matching between the target video and each candidate video segment is calculated based on the feature of each sampled frame, and finally, a video segment matching the target video in the videos to be searched is determined according to the degree of matching between the target video and each candidate video segment, so that segmented video search is realized, the segment matching the target video can be searched from long videos, and the accuracy of video search is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
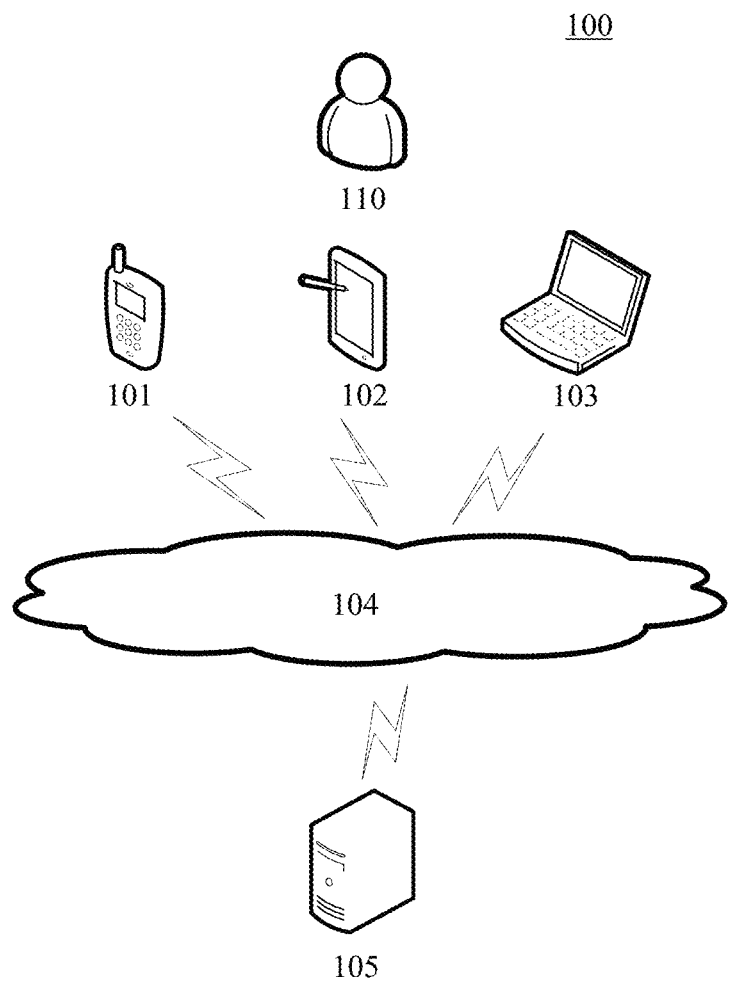
FIG. 1 is an exemplary system architecture diagram to which an embodiment of the present disclosure can be applied.

FIG. 1 shows an exemplary system architecture 100 to which a method for searching a video segment or an apparatus for searching a video segment according to the present disclosure can be applied.

As shown in FIG. 1, the system architecture 100 may include a terminal device 101, 102, and 103, a network 104, and a server 105. The network 104 serves as a medium providing a communication link between the terminal device 101, 102, and 103 and the server 105. The network 104 may include various types of connections, such as wired or wireless communication links, or optical fiber cables.

The terminal device 101, 102, or 103 may interact with the server 105 through the network 104 to receive or send messages. The terminal device 101, 102, or 103 may be a device on a user 110 side, and may be installed with various client applications, for example, various video editing applications, media playback applications, search applications, and the like.

The terminal device 101, 102, or 103 may be hardware or software. When the terminal device 101, 102, or 103 is hardware, the terminal device may be various electronic devices, including but not limited to a smart phone, a tablet computer, an e-book reader, a laptop computer and a desktop computer. When the terminal device 101, 102, or 103 is software, the terminal device may be installed in the above-listed electronic devices. The terminal device may be implemented as a plurality of software programs or software modules (for example, a plurality of software programs or software modules used to provide distributed services), or as a single software program or software module. Specific limitations are not given here.

The server 105 may be a server that runs various services, such as a server that provides background support for search applications or video websites. The server 105 may acquire a video search request of the terminal device 101, 102, or 103, parse the video search request to extract a target video, search a matching video or video segment in a network database or video library, and feed the search result back to the terminal device 101, 102, or 103.

It should be noted that the server 105 may be hardware or software. When the server 105 is hardware, the server may be implemented as a distributed server cluster composed of a plurality of servers, or as a single server. When the server 105 is software, the server may be implemented as a plurality of software programs or software modules (for example, a plurality of software programs or software modules used to provide distributed services), or as a single software program or software module. Specific limitations are not given here.

Alternatively, in some scenarios, the terminal device 101, 102, or 103 may also perform a video search operation, for example, search a video or video segment that the user desires to obtain in a local video library.

The method for searching a video segment according to the embodiments of the present disclosure may be executed by the terminal device 101, 102, or 103 or the server 105. Accordingly, the apparatus for searching a video segment may be arranged in the terminal device 101, 102, or 103 or the server 105.

In some scenarios, the terminal device 101, 102, or 103 or the server 105 may read a target video and a video database locally or acquire the target video and the video database from a database or the like. At this time, the exemplary system architecture 100 may not include the network 104 and the server 105, or may not include the terminal device 101, 102, or 103 and the network 104.

It should be understood that the numbers of the terminal devices, the network, and the server in FIG. 1 are merely illustrative. Any number of terminal devices, networks and servers may be configured according to actual requirements.

Figure 2:
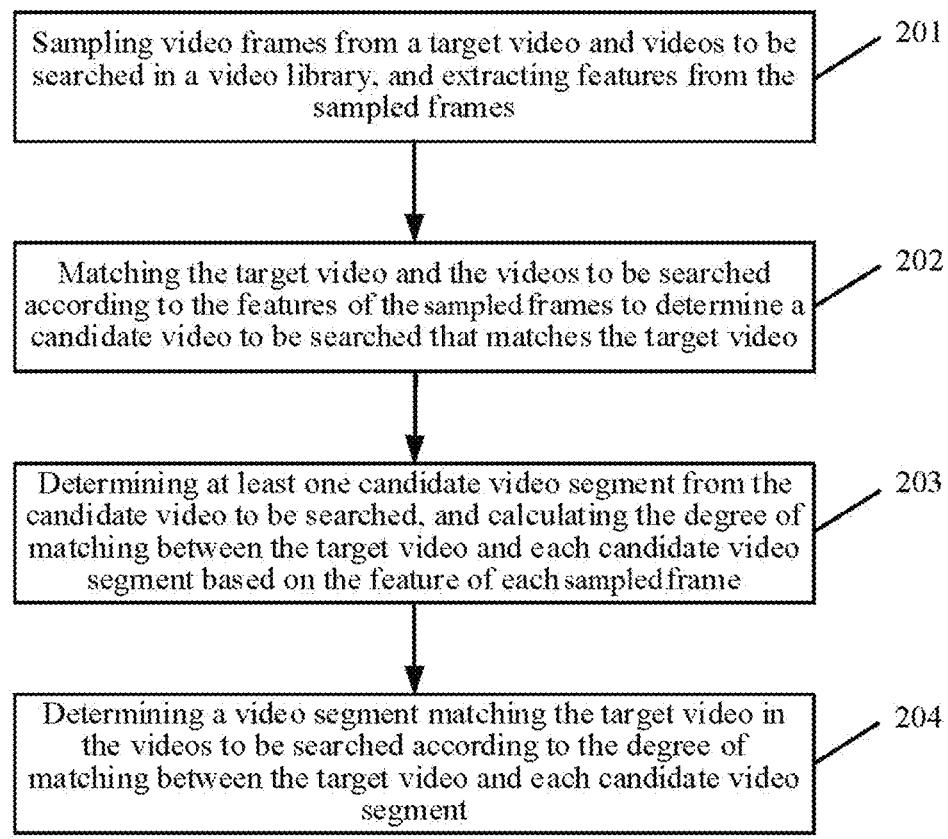
FIG. 2 is a flowchart of an embodiment of a method for searching a video segment according to the present disclosure.

Continuing to refer to FIG. 2, a flow 200 of an embodiment of a method for searching a video segment according to the present disclosure is shown. The method for searching a video segment includes the following flow:

Step 201: sampling video frames from a target video and videos to be searched in a video library, and extracting features from the sampled frames.

In this embodiment, the execution subject of the method for searching a video segment may acquire the target video and read the videos to be searched in the video library. The target video may be a video that a user desires to search out. The video library may be pre-built and include a plurality of videos.

In practice, the video library may be a video library of a video website, or a video database that is maintained by a back-end server of a search service or that has been authorized for access. The user may submit a video segment search request by uploading the target video. After acquiring the video segment search request of the user, the server may read videos in the video library as the videos to be searched.

In this embodiment, the video frames may be sampled from the target video and the videos to be searched in the video library, specifically according to a set sampling rate (for example, one frame per second) or a preset number of sampled frames (for example, 100 sampled frames), a plurality of sampled frames may be uniformly or non-uniformly sampled from the target video and the videos to be searched. Then, the execution subject may extract the features from the sampled frames. The specific feature extraction method may be an existing image feature extraction method, such as an SIFT (Scale-invariant feature transform) algorithm based on feature points, or the features may be extracted by a trained neural network.

In some optional implementation modes of this embodiment, the features may be extracted from the sampled frames by means of a trained image recognition neural network or image classification neural network. The image recognition neural network or image classification neural network includes a feature extraction layer and a classifier, wherein the feature extraction layer may include a plurality of convolutional layers, and the classifier may include a pooling layer, a fully connected layer and a nonlinear layer. The features of the sampled frames may be extracted by using the feature extraction layer. Specifically, the output of the last convolutional layer in the feature extraction layer is used as the extracted features of the sampled frames.

Further, the method for searching a video segment may further include the step of training the image recognition neural network or image classification neural network. During the training, parameters of the feature extraction layer may be adjusted iteratively based on sample images containing recognition annotation information or classification annotation information, and the parameters are adjusted by multiple iterations to continuously optimize the feature extraction layer, so that the trained image recognition neural network or image classification neural network can accurately extract image features.

Step 202: matching the target video and the videos to be searched according to the features of the sampled frames to determine a candidate video to be searched that matches the target video.

The feature of each sampled frame is a frame-level feature. In this embodiment, the features of the sampled frames in the target video may be fused to obtain a video-level feature of the target video. Similarly, for each video to be searched, the features of the sampled frames therein may be fused to obtain a video-level feature of the video to be searched.

Here, the features of the sampled frames in the same video may be fused by a feature stitching method, for example, the features of the sampled frames are normalized, converted into the same length and then stitched together; or the features of the sampled frames are combined into a multi-dimensional feature of the corresponding video, for example, the feature of each sampled frame is a 32-dimensional feature vector, the number of sampled frames in the video is 100 frames, then the features of the sampled frames are combined into a 32×100-dimensional feature matrix as the feature of the video.

Then, the feature of the target video may be matched with the feature of each video to be searched. Specifically, a similarity between the two, such as a cosine similarity, may be calculated. It may be determined whether the similarity is greater than a preset similarity threshold. If the similarity is greater than the preset similarity threshold, the corresponding video to be searched is determined to be a candidate video to be searched that matches the target video; otherwise, it may be determined that the corresponding video to be searched is not a candidate video to be searched that matches the target video. Alternatively, a preset number of videos to be searched with descending similarities may be selected from all the videos to be searched as candidate videos to be searched that match the target video.

In some optional implementation modes of this embodiment, the candidate video to be searched that matches the target video may be determined as follows: determining, according to the features of the sampled frames, matching results between the sampled frames in the target video and the sampled frames in the videos to be searched; and counting the matching results between the sampled frames in the target video and the sampled frames in the videos to be searched, and determining, according to the counted matching results, the candidate video to be searched that matches the target video.

In the above implementation modes, the sampled frames in the target video may be respectively matched with the sampled frames in the videos to be searched based on the features of the sampled frames to obtain the matching degrees between the sampled frames, the sampled frames of which the matching degrees exceed a preset frame-level matching degree threshold are counted, the sampled frames of which the matching degrees exceed the preset frame-level matching degree threshold among the sampled frames in the videos to be searched and the target video are extracted, and average values or sums of the corresponding matching degrees are calculated as counted values of the matching results between the sampled frames in the videos to be searched and the sampled frames in the target video. Then, at least one video to be searched with the largest counted value is selected as the candidate video to be searched.

Through this implementation mode, the target video and the videos to be searched can be matched at the frame level, thereby reducing the search range of video segments, and preliminarily screening out the candidate video to be searched that may contain matching video segments.

Step 203: determining at least one candidate video segment from the candidate video to be searched, and calculating the degree of matching between the target video and each candidate video segment based on the feature of each sampled frame.

Video segments may be segmented from the candidate video to be searched. For example, a plurality of candidate video segments may be extracted from the candidate video to be searched by means of a sliding window, wherein the boundary of the sliding window corresponds to the start position and end position of the candidate video segments. Alternatively, in some optional implementation modes, a content topic of each sampled frame may be identified according to the feature of the sampled frame, and whether different sampled frames belong to the same video segment may be determined according to the correlation between the content topics of different sampled frames in the same candidate video to be searched, thereby realizing the segmentation of the video segments. Here, the content topic of the sampled frame may include an object attribute in an image, such as the posture of a pedestrian, the identity of a person, the shape/color/position of an obstacle, or a content attribute such as the style, color tone, or scenario of the image.

Optionally, the length of the target video may be acquired, and at least one candidate video segment whose length close to the length of the target video is determined from the candidate video to be searched. For example, the length of the target video is 1 minute, then the length of the candidate video segments may be between 55 seconds and 65 seconds.

In practice, fast or slow playback is used in video editing, so the length of the candidate video segments may also be quite different from the length of the target video.

For each candidate video segment, a video-level feature of the candidate video segment may be determined based on each sampled frame contained in the candidate video segment. Then, the degree of matching between the target video and the candidate video segment may be calculated based on the video-level feature of the target video and the video-level feature of the candidate video segment. For example, a cosine similarity between the two or a distance between the two may be calculated as the matching degree.

In some optional implementation modes, at least one candidate video segment may be determined from the candidate video to be searched as follows: combining every two sampled frames of the candidate video to be searched to obtain at least one sampled frame pair, and using the two sampled frames in the sampled frame pair as a start frame and an end frame of a candidate video segment to obtain the at least one candidate video segment.

It is assumed that N sampled frames are sampled from the candidate video to be searched, respectively $B_1, B_2, \ldots, B_N$, then every two of the N sampled frames are combined to obtain sampled frame pairs $(B_1, B_2), (B_1, B_3), \ldots, (B_1, B_N)$, $(B_2, B_3), (B_2, B_4), \ldots, (B_2, B_N), \ldots, (B_{N-1}, B_N)$, each sampled frame corresponds to a candidate video segment, the sampled frame of the sampled frame pair with a smaller time value in the original candidate video to be searched is a start frame of the candidate video segment, while the sampled frame of the sampled frame pair with a larger time value in the original candidate video to be searched is an end frame of the candidate video segment. In this way, the video segments formed by all the sampled frames in the candidate video to be searched can be traversed, and the lengths of the video segments are not limited, so that the method can be used to match fast played or slow played video segments.

Step 204: determining a video segment matching the target video in the videos to be searched according to the degree of matching between the target video and each candidate video segment.

The candidate video segment with the highest degree of matching with the target video may be determined as the video segment matching the target video. Alternatively, according to the positions of all the sampled frames contained in the candidate video segments on a corresponding time axis of the videos to be searched, a complete video segment matching the target video in the videos to be searched is positioned by means of search and optimization before and after the start time and end time of the candidate video segments.

In the method for searching a video segment according to the above embodiment of the present disclosure, video frames are sampled from a target video and videos to be searched in a video library, features are extracted from the sampled frames, then the target video and the videos to be searched are matched according to the features of the sampled frames to determine a candidate video to be searched that matches the target video, at least one candidate video segment is determined from the candidate video to be searched, the degree of matching between the target video and each candidate video segment is calculated based on the feature of each sampled frame, and finally, a video segment matching the target video in the videos to be searched is determined according to the degree of matching between the target video and each candidate video segment, so that segmented video search is realized, the segment matching the target video can be searched from long videos, and the accuracy of video search is improved.

Figure 3:
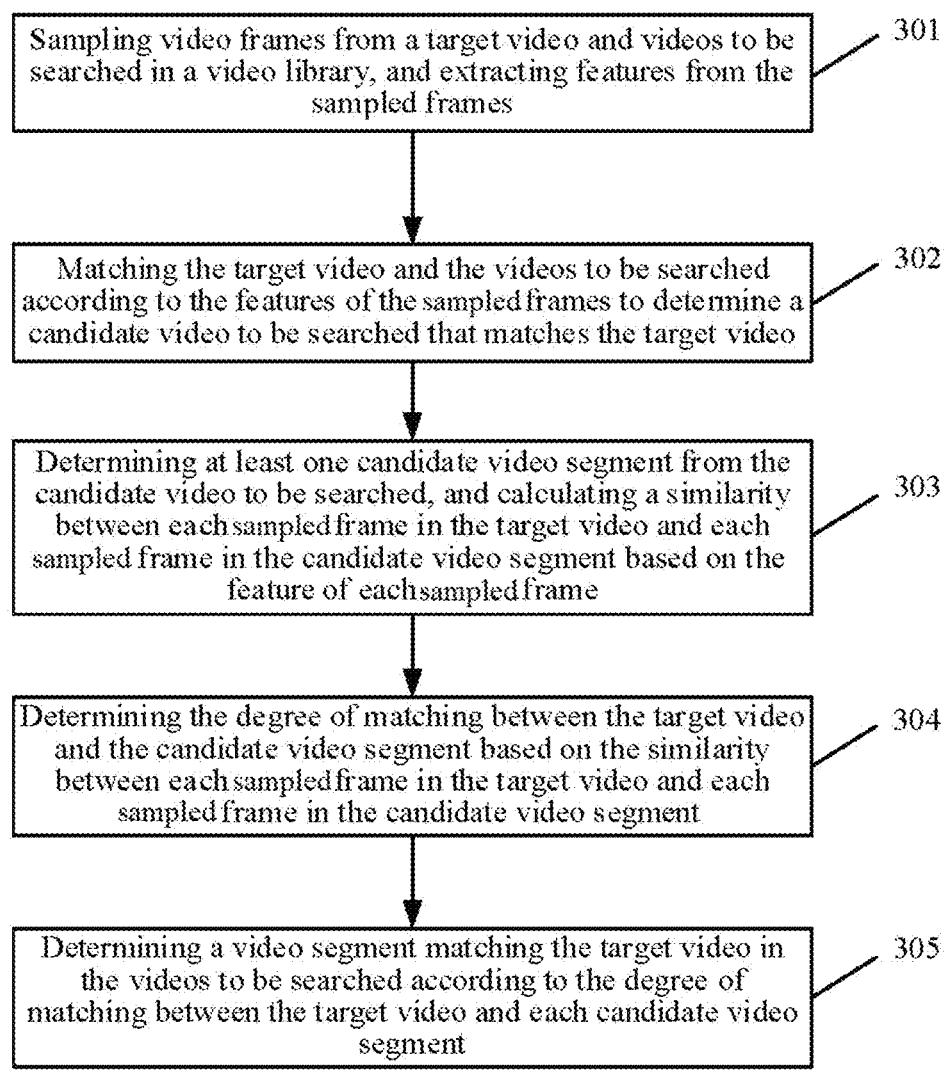
FIG. 3 is a flowchart of another embodiment of a method for searching a video segment according to the present disclosure.

Continuing to refer to FIG. 3, a flow of another embodiment of a method for searching a video segment according to the present disclosure is shown. As shown in FIG. 3, the flow 300 of the method for searching a video segment in this embodiment includes the following steps:

Step 301: sampling video frames from a target video and videos to be searched in a video library, and extracting features from the sampled frames.

Step 302: matching the target video and the videos to be searched according to the features of the sampled frames to determine a candidate video to be searched that matches the target video.

Step 301 and step 302 of this embodiment are respectively consistent with step 201 and step 202 of the foregoing embodiment. The specific implementation modes of step 301 and step 302 may be respectively referred to the descriptions of step 201 and step 202 in the foregoing embodiment. Details are not described herein again.

Step 303: determining at least one candidate video segment from the candidate video to be searched, and calculating a similarity between each sampled frame in the target video and each sampled frame in the candidate video segment based on the feature of each sampled frame.

In this embodiment, after the candidate video to be searched is determined, video segments may be segmented from the candidate video to be searched to obtain the at least one candidate video segment. Specifically, a plurality of candidate video segments may be extracted from the candidate video to be searched by means of a sliding window, or a content topic of each sampled frame may be identified based on the feature of the sampled frame, and the video segments are segmented based on the correlation between the content topics of the sampled frames in the candidate video to be searched. Alternatively, in some optional implementation modes, every two sampled frames of the candidate video to be searched may be combined to obtain at least one sampled frame pair, and the two sampled frames in the sampled frame pair are respectively used as a start frame and an end frame of a candidate video segment to obtain the at least one candidate video segment.

It should be noted that, for a long video, many candidate video segments are obtained by means of combination in pairs. In order to improve the search speed of a video segment, in the embodiments of the present disclosure, for a long candidate video to be searched, candidate video segments may be filtered by a pruning method, for example, candidate video segments which contain sampled frames having average similarities with the sampled frames of the target video smaller than a threshold may be filtered out.

Alternatively, the candidate video segments may be preliminarily screened by means of a pre-trained detection network.

Then, the similarities between the sampled frames in the candidate video segments and the sampled frames in the target video may be calculated based on the features of the sampled frames. Specifically, the feature of the sampled frame X is $\{X_i\}$, the feature of the sampled frame Y is $\{Y_i\}$, then the similarity $sim(X, Y)$ between the sampled frames X and Y is:

$$sim(x, y) = \frac{1}{2W \times H} \left( \sum_{i}^{W \times H} \max_j \text{dot}(X_i, Y_j) + \sum_{j}^{W \times H} \max_i \text{dot}(Y_j, X_i) \right) \quad (1)$$

Where, W×H is the number of features extracted from the sampled frames, dot $(X_i, Y_j)$ is an inner product of $X_i$ and $Y_j$, and dot $(Y_j, X_i)$ is an inner product of $Y_j$ and $X_i$.

In this embodiment, the similarity between each sampled frame in the target video and each sampled frame in the candidate video segment may be calculated by means of equation (1) above to obtain a frame-level similarity.

Step 304: determining the degree of matching between the target video and the candidate video segment based on the similarity between each sampled frame in the target video and each sampled frame in the candidate video segment.

Then, the degree of matching at the video-level may be calculated. Specifically, the sampled frames of the target video A are expressed as $(A_{a1}, A_{a1+1}, \ldots, A_{a2})$; and the sampled frames in the candidate video segment B are $B_{b1}$ $B_{b1+1}, \ldots, B_{b2}$), where a1, a2, b1, and b2 are positive integers, a1<a2, b1<b2. Then, the frame-level similarity SIM(A(a1, a2), B(b1, b2)) between the target video and the candidate video segment may be calculated as follows:

$$SIM(A(a1, a2), B(b1, b2)) = \frac{1}{(a2 - a1)(b2 - b1)} \left( \sum_{i=a1}^{a2} \sum_{j=b1}^{b2} sim(A_i, B_j) \right) \quad (2)$$

The frame-level similarity between the target video and the candidate video segment may be used as the degree of matching between the two.

Alternatively, in some optional implementation modes of this embodiment, the degree of matching between the target video and the candidate video segment may be further determined according to the frame-level similarity between the target video and the candidate video segment as follows: superimposing the similarity between the target video and the candidate video segment with a preset value of a reward function to obtain the degree of matching between the target video and the candidate video segment, wherein the preset value of the reward function is positively correlated with the length of the candidate video segment.

The reward function R is:

$$R = \lambda \ln \left( \frac{b2 - b1}{l_0} \right) \quad (3)$$

Alternatively, in some embodiments, the preset value of the reward function may be positively correlated with the length of the target video, and the reward function is:

$$R = \lambda \ln\left(\frac{a2-a1}{l_0}\right) \qquad (4)$$

In this way, the degree P of matching between the target video A and the candidate video segment B is:

$$P = SIM(A(a1,a2), B(b1,b2)) + R \qquad (5)$$

Where, $\lambda$ and $l_0$ are hyper-parameters, which may be preset or learned by training. If $\lambda$ and $l_0$ are larger, the search of a longer video segment is encouraged.

In this way, by rewarding the length of the searched video segment, the search of the longer video segment can be encouraged, thereby improving the accuracy of video segment search results.

Further, when the candidate video segments are being determined, at least one candidate video segment, a ratio of whose length to the length of a target video is within a preset interval, may be determined from the candidate video to be searched.

Specifically, the magnification of fast playback and slow playback of a video may be limited by setting the range of the ratio of lengths of the target video to the length of the candidate video segment, specifically:

$$\frac{1}{k} \leq \frac{a2-a1}{b2-b1} \leq k \qquad (6)$$

Where, k is a maximum scale factor of fast playback or slow playback, which may be preset, for example, set to 2. It should be noted that here, the frame rates of the target video and the videos to be searched are the same.

By limiting the scale factor of fast playback or slow playback of the video in the foregoing implementation mode, the method can be applied to segment search in videos that are clipped or stitched by fast playback or slow playback.

Step 305: determining a video segment matching the target video in the videos to be searched according to the degree of matching between the target video and each candidate video segment.

After the degree of matching between the target video and each candidate video segment is determined, the candidate video segment with the highest degree of matching can be selected as the searched video segment matching the target video.

According to the flow 300 of the method for searching a video segment in this embodiment, the frame-level degree of matching is first determined for the target video and the candidate video segment, and the video-level degree of matching is determined based on an average value of the frame-level matching degrees of the sampled frames, so that more accurate video-level matching results can be obtained. In addition, by setting the reward function related to the length of the video segment, the search of too short video segments can be further avoided, and the reliability of the search results can be improved.

In some optional implementation modes of the embodiment described above in conjunction with FIGS. 2 and 3, the video segment matching the target video in the videos to be searched may be further determined according to the degree of matching between the target video and each candidate video segment as follows: determining, from the candidate video segments, a target candidate video segment whose degree of matching with the target video satisfies a preset condition; searching previous frames based on the position of the sampled frame serving as a start frame of the target candidate video segment in the corresponding video to be searched, searching subsequent frames based on the position of the sampled frame serving as an end frame of the target candidate video segment in the corresponding video to be searched, and determining a start frame and an end frame of the video segment matching the target video in the corresponding video to be searched.

Specifically, after the target video segment whose degree of matching with the target video is maximum or exceeds a preset threshold is determined from the candidate video segments, the position of the target video segment in the original video to be searched can be determined, and the start frame and end frame of the target video segment in the video to be searched can be positioned.

Since the target video segment is determined based on the sampled frames, in order to further compensate for the error caused by sampling, previous frames with consistent or consecutive content topic as the target video segment can be searched from the video frames within a previous preset time period (for example, within 1 minute) using the start frame of the target video segment in the video to be searched as a start point, subsequent frames with consistent or consecutive content topic as the target video segment can be searched from the video frames within a subsequent preset time period (for example, within 1 minute) using the end frame of the target video segment as an end point, and the position of the video segment matching the target video in the video to be searched can be calibrated. This can further improve the accuracy of the search results of the video segments.

In the above method, the video to be searched where the searched video segment is located and the start time and end time of the video segment in the video to be searched can be pushed to the user to inform the user of the search result of the video segment, thereby helping the user to quickly browse the information desired to be acquired.

Figure 4:
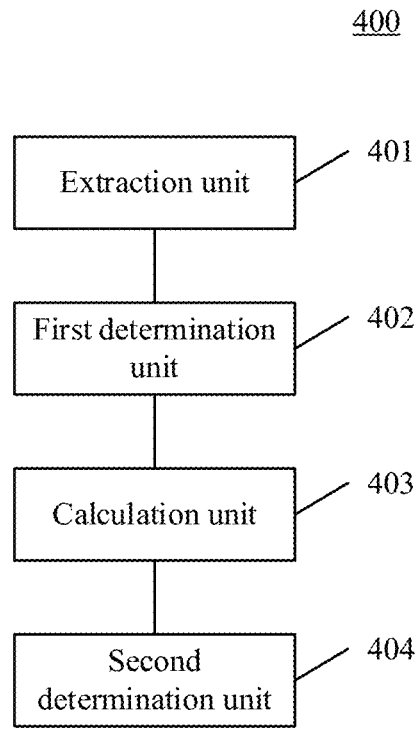
FIG. 4 is a schematic structural diagram of an embodiment of an apparatus for searching a video segment according to the present disclosure.

Referring to FIG. 4, as an implementation of the above-mentioned method for searching a video segment, the present disclosure provides an embodiment of an apparatus for searching a video segment. The embodiment of the apparatus corresponds to the embodiments of the methods shown in FIGS. 2 and 3, and the apparatus may be applied to various electronic devices.

As shown in FIG. 4, the apparatus 400 for searching a video segment in this embodiment includes an extraction unit 401, a first determination unit 402, a calculation unit 403, and a second determination unit 404. The extraction unit 401 is configured to sample video frames from a target video and videos to be searched in a video library, and extract features from the sampled frames; the first determination unit 402 is configured to match the target video and the videos to be searched according to the features of the sampled frames to determine a candidate video to be searched that matches the target video; the calculation unit 403 is configured to determine at least one candidate video segment from the candidate video to be searched, and calculate the degree of matching between the target video and each candidate video segment based on the feature of each sampled frame; and the second determination unit 404 is configured to determine a video segment matching the target video in the videos to be searched according to the degree of matching between the target video and each candidate video segment.

In some embodiments, the first determination unit 402 includes: a matching unit, configured to determine, according to the features of the sampled frames, matching results between the sampled frames in the target video and the sampled frames in the videos to be searched; and a counting unit, configured to count the matching results between the sampled frames in the target video and the sampled frames in the videos to be searched, and determine, according to the counted matching results, the candidate video to be searched that matches the target video.

In some embodiments, the calculation unit 403 is configured to determine the at least one candidate video segment from the candidate video to be searched as follows: combining every two sampled frames of the candidate video to be searched to obtain at least one sampled frame pair, and using the two sampled frames in the sampled frame pair as a start frame and an end frame of a candidate video segment to obtain the at least one candidate video segment.

In some embodiments, the calculation unit 403 is configured to calculate the degree of matching between the target video and each candidate video segment based on the feature of each sampled frame as follows: calculating the similarity between each sampled frame in the target video and each sampled frame in the candidate video segment based on the feature of each sampled frame; and determining the degree of matching between the target video and the candidate video segment based on the similarity between each sampled frame in the target video and each sampled frame in the candidate video segment.

In some embodiments, the second determination unit 404 includes: a video-level similarity calculation unit, configured to determine a similarity between the target video and the candidate video segment based on the similarity between each sampled frame in the target video and each sampled frame in the candidate video segment; and a reward function superimposition unit, configured to superimpose the similarity between the target video and the candidate video segment with a preset value of a reward function to obtain the degree of matching between the target video and the candidate video segment; wherein the preset value of the reward function is positively correlated with the length of the candidate video segment.

In some embodiments, the calculation unit 403 is configured to determine the at least one candidate video segment from the candidate video to be searched as follows: determining the at least one candidate video segment, a ratio of whose length to a length of the target video within a preset interval from the candidate video to be searched.

In some embodiments, the second determination unit 404 includes: a screening unit, configured to determine, from the candidate video segments, a target candidate video segment whose degree of matching with the target video satisfies a preset condition; and a search unit, configured to search previous frames based on the position of the sampled frame serving as a start frame of the target candidate video segment in the corresponding video to be searched, search subsequent frames based on the position of the sampled frame serving as an end frame of the target candidate video segment in the corresponding video to be searched, and determine a start frame and an end frame of the video segment matching the target video in the corresponding video to be searched.

The units in the apparatus 400 correspond to the steps in the method described with reference to FIGS. 2 and 3. Therefore, the operations, features, and achievable technical effects described above with regard to the method for searching a video segment are also applicable to the apparatus 400 and the units included therein, and details are not described herein again.

Hereinafter, referring to FIG. 5, a schematic structural diagram of an electronic device (for example, the server in FIG. 1) 500 adapted to implement the embodiments of the present disclosure is shown. The electronic device shown in FIG. 5 is merely an example, and should not limit the function and scope of use of the embodiments of the present disclosure.

Figure 5:
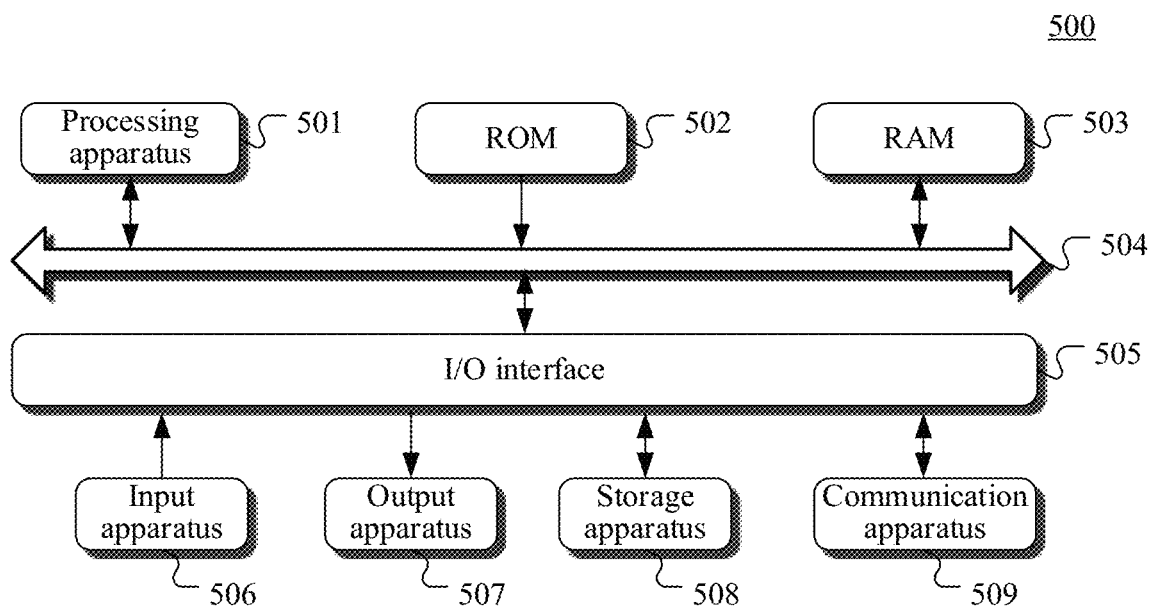
FIG. 5 is a schematic structural diagram of a computer system adapted to implement an electronic device according to an embodiment of the present disclosure.

As shown in FIG. 5, the electronic device 500 may include a processing apparatus (for example, a central processing unit, a graphics processor, etc.) 501, which may execute various appropriate actions and processes in accordance with a program stored in a read-only memory (ROM) 502 or a program loaded into a random access memory (RAM) 503 from a storage apparatus 508. The RAM 503 also stores various programs and data required by operations of the electronic device 500. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 including a touch screen, a touch pad, a keyboard, a mouse, a camera, a microphone, an accelerometer, a gyroscope, or the like; an output apparatus 507 including a liquid crystal display (LCD), a speaker, a vibrator, or the like; a storage apparatus 508 including a hard disk or the like; and a communication apparatus 509. The communication apparatus 509 may allow wireless or wired communication between the electronic device 500 and other device to exchange data. Although FIG. 5 illustrates the electronic device 500 having various apparatuses, it should be understood that all the illustrated apparatuses are not required to be implemented or included. More or less apparatuses may be alternatively implemented or included. Each block shown in FIG. 5 may represent an apparatus or a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 509, or may be installed from the storage apparatus 508, or may be installed from the ROM 502. The computer program, when executed by the processing apparatus 501, implements the above-mentioned functionalities as defined by the method of the embodiments of the present disclosure. It should be noted that the computer readable medium in the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wired, optical cable, RF (Radio Frequency) etc., or any suitable combination of the above.

The computer-readable medium may be included in the electronic device, or exists alone and is not assembled into the electronic device. The computer-readable medium carries one or more programs. When the one or more programs are executed by the electronic device, the electronic device is caused to: sample video frames from a target video and videos to be searched in a video library, and extract features from the sampled frames; match the target video and the videos to be searched according to the features of the sampled frames to determine a candidate video to be searched that matches the target video; determine at least one candidate video segment from the candidate video to be searched, and calculate the degree of matching between the target video and each candidate video segment based on the feature of each sampled frame; and determine a video segment matching the target video in the videos to be searched according to the degree of matching between the target video and each candidate video segment.

A computer program code for performing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an extraction unit, a first determination unit, a calculation unit and a second determination unit. Here, the names of these units do not in some cases constitute limitations to such units themselves. For example, the extraction unit may also be described as "a unit for sampling video frames from a target video and videos to be searched in a video library, and extracting features from the sampled frames".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for searching a video segment, comprising:
    sampling video frames from a target video and videos to be searched in a video library, and extracting features from the sampled video frames;
    matching the target video and the videos to be searched according to the extracted features to determine a candidate video to be searched that matches the target video;
    determining at least one candidate video segment from the determined candidate video to be searched, wherein a first ratio of a length of a first candidate video segment alone to a length of the target video is within a preset interval, and a second ratio of a length of a second candidate video segment alone to the length of the target video is within the preset interval, and calculating a degree of matching between the target video and each candidate video segment based on the extracted features of each sampled frame; and
    determining a video segment matching the target video in the videos to be searched according to the degree of matching between the target video and each candidate video segment.

2. The method according to claim 1, wherein the matching comprises:
    determining, according to the extracted features of the sampled video frames, matching results between the sampled video frames in the target video and the sampled video frames in the videos to be searched; and counting the matching results, and determining, according to the counted matching results, the candidate video to be searched that matches the target video.

3. The method according to claim 1, wherein the determining at least one candidate video segment from the candidate video to be searched comprises:
combining every two sampled video frames of the candidate video to be searched, to obtain at least one sampled frame pair, and using the two sampled video frames in the sampled frame pair as a start frame and an end frame of a candidate video segment to obtain the at least one candidate video segment.

4. The method according to claim 1, wherein the calculating comprises:
calculating a similarity between each sampled frame in the target video and each sampled frame in the candidate video segment based on the extracted features of each sampled frame; and
determining the degree of matching between the target video and the candidate video segment based on the similarity between each sampled frame in the target video and each sampled frame in the candidate video segment.

5. The method according to claim 4, wherein the determining the degree of matching between the target video and the candidate video segment comprises:
determining a similarity between the target video and the candidate video segment based on the similarity between each sampled frame in the target video and each sampled frame in the candidate video segment; and
superimposing the similarity between the target video and the candidate video segment with a preset value of a reward function to obtain the degree of matching between the target video and the candidate video segment,
wherein the preset value of the reward function is positively correlated with a length of the candidate video segment.

6. The method according to claim 1, wherein the determining a video segment matching the target video in the videos to be searched comprises:
determining, from the candidate video segment, a target candidate video segment whose degree of matching with the target video satisfies a preset condition; and
searching previous frames based on a position of a sampled frame serving as a start frame of the target candidate video segment in a corresponding video to be searched, searching subsequent frames based on a position of the sampled frame serving as an end frame of the target candidate video segment in the corresponding video to be searched, and determining a start frame and an end frame of the video segment matching the target video in the corresponding video to be searched.

7. An electronic device, comprising:
one or more processors; and
a storage apparatus, storing one or more programs, wherein the one or more programs, when executed by the one or more processors, cause the one or more processors to perform an operation for searching a video segment, comprising:
sampling video frames from a target video and videos to be searched in a video library, and extracting features from the sampled video frames;
matching the target video and the videos to be searched according to the extracted features to determine a candidate video to be searched that matches the target video;
determining at least one candidate video segment from the determined candidate video to be searched, wherein a first ratio of a length of a first candidate video segment alone to a length of the target video is within a preset interval, and a second ratio of a length of a second candidate video segment alone to the length of the target video is within the preset interval, and calculating a degree of matching between the target video and each candidate video segment based on the extracted features of each sampled frame; and
determining a video segment matching the target video in the videos to be searched according to the degree of matching between the target video and each candidate video segment.

8. The electronic device according to claim 7, wherein the matching comprises:
determining, according to the extracted features of the sampled video frames, matching results between the sampled video frames in the target video and the sampled video frames in the videos to be searched; and
counting the matching results, and determining, according to the counted matching results, the candidate video to be searched that matches the target video.

9. The electronic device according to claim 7, wherein the determining at least one candidate video segment from the candidate video to be searched comprises:
combining every two sampled video frames of the candidate video to be searched, to obtain at least one sampled frame pair, and using the two sampled video frames in the sampled frame pair as a start frame and an end frame of a candidate video segment to obtain the at least one candidate video segment.

10. The electronic device according to claim 7, wherein the calculating comprises:
calculating a similarity between each sampled frame in the target video and each sampled frame in the candidate video segment based on the extracted features of each sampled frame; and
determining the degree of matching between the target video and the candidate video segment based on the similarity between each sampled frame in the target video and each sampled frame in the candidate video segment.

11. The electronic device according to claim 10, wherein the determining the degree of matching between the target video and the candidate video segment comprises:
determining a similarity between the target video and the candidate video segment based on the similarity between each sampled frame in the target video and each sampled frame in the candidate video segment; and
superimposing the similarity between the target video and the candidate video segment with a preset value of a reward function to obtain the degree of matching between the target video and the candidate video segment,
wherein the preset value of the reward function is positively correlated with a length of the candidate video segment.

12. The electronic device according to claim 7, wherein the determining a video segment matching the target video in the videos to be searched comprises:

determining, from the candidate video segment, a target candidate video segment whose degree of matching with the target video satisfies a preset condition; and searching previous frames based on a position of a sampled frame serving as a start frame of the target candidate video segment in a corresponding video to be searched, searching subsequent frames based on a position of the sampled frame serving as an end frame of the target candidate video segment in the corresponding video to be searched, and determining a start frame and an end frame of the video segment matching the target video in the corresponding video to be searched.

13. A non-transitory computer-readable storage medium, storing a computer program thereon, wherein the computer program, when executed by a processor, causes the processor to perform an operation for searching a video segment, comprising:

sampling video frames from a target video and videos to be searched in a video library, and extracting features from the sampled video frames;

matching the target video and the videos to be searched according to the extracted features to determine a candidate video to be searched that matches the target video;

determining at least one candidate video segment from the determined candidate video to be searched, wherein a first ratio of a length of a first candidate video segment alone to a length of the target video is within a preset interval, and a second ratio of a length of a second candidate video segment alone to the length of the target video is within the preset interval, and calculating a degree of matching between the target video and each candidate video segment based on the extracted features of each sampled frame; and determining a video segment matching the target video in the videos to be searched according to the degree of matching between the target video and each candidate video segment.

14. The non-transitory computer-readable storage medium according to claim 13, wherein the matching comprises:

determining, according to the extracted features of the sampled video frames, matching results between the sampled video frames in the target video and the sampled video frames in the videos to be searched; and counting the matching results, and determining, according to the counted matching results, the candidate video to be searched that matches the target video.

15. The non-transitory computer-readable storage medium according to claim 13, wherein the determining at least one candidate video segment from the candidate video to be searched comprises:

combining every two sampled video frames of the candidate video to be searched, to obtain at least one sampled frame pair, and using the two sampled video frames in the sampled frame pair as a start frame and an end frame of a candidate video segment to obtain the at least one candidate video segment.

16. The non-transitory computer-readable storage medium according to claim 13, wherein the calculating comprises:

calculating a similarity between each sampled frame in the target video and each sampled frame in the candidate video segment based on the extracted features of each sampled frame; and determining the degree of matching between the target video and the candidate video segment based on the similarity between each sampled frame in the target video and each sampled frame in the candidate video segment.

17. The non-transitory computer-readable storage medium according to claim 16, wherein the determining the degree of matching between the target video and the candidate video segment comprises:

determining a similarity between the target video and the candidate video segment based on the similarity between each sampled frame in the target video and each sampled frame in the candidate video segment; and superimposing the similarity between the target video and the candidate video segment with a preset value of a reward function to obtain the degree of matching between the target video and the candidate video segment, wherein the preset value of the reward function is positively correlated with a length of the candidate video segment.

* * * * *